United States Patent [19]
Bhaskaran et al.

[11] Patent Number: 6,157,915
[45] Date of Patent: Dec. 5, 2000

[54] METHOD AND APPARATUS FOR COLLABORATIVELY MANAGING SUPPLY CHAINS

[75] Inventors: Kumar Bhaskaran, Kearny, N.J.; Daniel P. Connors, Wappingers Falls, N.Y.; Fenno F. Heath, III, New Haven, Conn.; Nitin Nayak, Ossining, N.Y.

[73] Assignee: International Business Machines Corporation, Armonk, N.Y.

[21] Appl. No.: 09/131,114

[22] Filed: Aug. 7, 1998

[51] Int. Cl.[7] .............................. G06F 17/60; G06F 15/00
[52] U.S. Cl. ......................... 705/7; 705/1; 705/7; 705/8; 705/9; 705/10; 705/11; 705/14; 705/26; 705/27
[58] Field of Search ................................... 705/7, 1, 8, 9, 705/10, 11, 28, 29, 26, 27, 14

[56] References Cited

U.S. PATENT DOCUMENTS

| | | | |
|---|---|---|---|
| 4,937,743 | 6/1990 | Rassman et al. | 705/7 |
| 5,237,497 | 8/1993 | Sitarski | 705/7 |
| 5,765,138 | 6/1998 | Aycock et al. | 705/7 |
| 5,923,552 | 7/1999 | Brown et al. | 705/7 |
| 5,953,707 | 9/1999 | Huang et al. | 705/10 |
| 5,983,194 | 11/1999 | Hogge et al. | 705/7 |
| 5,987,443 | 11/1999 | Nichols et al. | 706/11 |
| 6,006,192 | 9/1999 | Cheng et al. | 705/7 |
| 6,023,691 | 2/2000 | Bertrand et al. | 706/2 |

FOREIGN PATENT DOCUMENTS

| | | |
|---|---|---|
| WO 9705589 | 2/1997 | European Pat. Off. . |
| WO 9808177 | 2/1998 | European Pat. Off. . |

OTHER PUBLICATIONS

Danforth, Janet E., "Facilitating Dynamic Group Role Play", International Association of Faciliators, Jan. 14–17, 1999.
Goldin, Daniel S., "Ready for the future", Mechanical Engineering–CIMI, 121, 11, 61, Nov., 1999.
Corbett, Charles J., "Partnerships to improve supply chains", Sloan Management Review, 40, 4, 71(1), Summer, 1999.
"Planning at Hewlett–Packard", Manufacturing Systems, v13 n4, pp. 16–18, Apr. 1995.
Stuart, F Ian, "Supply–chain strategy: Organizational influence through Supplier alliances", British Journal of Management, v8 n3, pp. 223–236, Sep. 1997.
Abl, Robert, "Re–engineering a pharmaceutical supply chain", Purchasing & Supply Management, pp: 40–42, Sep. 1994.
"PeopleSoft Debuts Manufacturing Software", News Release, pN/A, Oct. 15, 1996.
Allen, Jeffrey W., "Group decision support systems and their effect on decision making in the NFL draft", Georgia State Univ, Atlanta, GA, USA, 1996.
Hicks, Donald A., "Four step methodology for using simulation and optimization technologies in strategic supply chain planning", LLama–Soft, Inc, 1999.
Elizandre, D.W., Expert simulation in the context of manufacturing environment: Dept of Comput. Sci., East Texas State Univ, 1992.
Pamukcu, D., "IBM: a comuter interactive project management teaching tool", Computers & Industrial Engineering, vol.9, No. 3, p. 231–245, 1985.

*Primary Examiner*—James P. Trammell
*Assistant Examiner*—Nga B. Nguyen
*Attorney, Agent, or Firm*—Whitham, Curtis & Whitham; Stephen C. Kaufman, Esq.

[57] ABSTRACT

An active collaboration technology in an open architectural framework that delivers information and decision support tools in a timely, contextual and role sensitive manner to present a collaborative dynamic decision making capability to a community of role players within a supply chain process. Such a comprehensive collaborative dynamic decision making capability is made possible through the integration of the business process, the organization of role players and relevant business applications.

22 Claims, 10 Drawing Sheets

☐ EDIT DOCUMENT  ☐ NEW TOPIC  ☐ DELETE

SCENARIO PLANNER

NAME: TERRY HEATH  DATE: 12/18/97
SCENARIO NAME: TEST  PLANNING CYCLE: DECEMBER
STATUS: OPEN

DEMAND:  CAPACITY  PRODUCTION  MATERIAL
☐~310  ☐~320  ☐~330  ☐~340

[RUN SCE ENGINE]~350

TERRY HEATH

☐ EDIT DOCUMENT   ☐ NEW TOPIC   ☐ DELETE

SCENARIO PLANNER

NAME: TERRY HEATH    DATE: 12/18/97
SCENARIO NAME: TEST    PLANNING CYCLE: DECEMBER
STATUS: OPEN

DEMAND:
☐ ~310

TERRY HEATH

FIG.3A

DEMAND PLANNER

NAME: TERRY HEATH    DATA: 12/18/97
SCENARIO: TEST    PLANNING CYCLE: DECEMBER
              STATUS: OPEN

SELECTION | SPREADSHEET

PARTNUMBER
GEOGRAPHY
SUBGEOGRAPHY
PDF
PERIODNUM
PRIORITY
REVENUE
PROFIT
MINDEMANDVOL
DEMANDVOL
MAXDEMANDVOL
SUPPLYVOL
BACKLOGVOL
BACKLOGYIELD hhd, hi-rel, 1.0
hhd, hi-rel, 1.6
hhd scsi 1.0
hhd scsi 1.6
hhd ssa 1.0
hhd ssa 1.6

Columns to display:
PARTNUMBER
GEOGRAPHY
PDF
PERIODNUM
PRIORITY
REVENUE
PROFIT
DEMANDVOL
SUPPLYVOL
BACKLOGVOL

APPLY — 440

410 — NAME/SCENARIO
420 — SELECTION|SPREADSHEET
430

METHOD AND APPARATUS FOR COLLABORATIVELY MANAGING SUPPLY CHAINS

BACKGROUND OF THE INVENTION

1. Field of the Invention

The present invention generally relates to a method and apparatus for managing supply chains and, more particularly, to a method and apparatus for collaboratively managing supply, production and distribution in a global marketplace using networked computer systems.

2. Background Description

In today's global economy, supply chains (e.g., suppliers, assemblers, distributors, etc.) are commonly used in order to deliver reliable and affordable goods to the global marketplace. That is, suppliers typically provide a wide range of materials, ranging from raw materials to component products, to production facilities (e.g., sub and final production assemblers) so that the production facilities may assemble the component products into an assembled product ready for the marketplace. Following the production of the assembled products, distributors then distribute the assembled products to the global marketplace.

For example, when manufacturing computer storage products, (i) disk vendors, (ii) motor vendors, (iii) base vendors and (iv) head vendors furnish their respective components to the production facilities for assembly into the finished computer storage product. Thereafter, the distributor then distributes the assembled computer storage products, for example, to the global marketplace.

However, in order to maintain optimal efficiency of these supply chains, many complexities must be overcome. These complexities range from material constraints at the parts supplier to capacity constraints at the production facility to volatile demand from various global markets at the distribution end of the supply chain. Other complexities include organizational and geographical limitations.

Thus, in order for the supply chain to work in its intended manner, all parties involved in the supply chain (e.g., from suppliers to distributors) must coordinate their activities with one another so that efficiency throughout the supply chain is optimally maintained. For example, when producing and distributing computer storage products, an Asian supplier and a European supplier must coordinate their component delivery schedules with several production facilities located in, for example, North America and South America so that the production facilities have the proper components in a timely manner. The production facilities must then coordinate their schedules with the distributor so that the distributor can meet the demands for assembled computer storage products within a specific geographic location.

By way of further example, when the Asian supplier cannot meet the demand of the production facilities, the European supplier, or other supplier, must then coordinate their activities with the Asian supplier as well as the production facilities in order to then immediately increase their component delivery to the production facilities. Also, when, for example, the North America production facility sees an increase in demand, while the South American production facility sees a decrease in demand, both the European and Asian suppliers must coordinate their delivery amounts to the North and South American production facilities, respectively. Thus, the suppliers are not only dependent on the production facilities, but are also dependent on the demands of the distributors.

As seen from the above examples, supply chains by their very nature, transcend functional, process, organizational, geographical and enterprise boundaries (i.e., a corporation for example may comprise many separate divisions). That is, the many "role players" (e.g., parties) within the supply chain not only work within their own respective organizational and geographical boundaries, but must also interact with the other supply chain role players in order to ultimately deliver an assembled product, e.g., computer storage products, to the marketplace.

Thus, it is very important for the parties in the supply chain to coordinate their activities for good efficiency which heretofore has not been possible. However, as seen from the above examples, some of these activities must be coordinated amongst the several parties on the "fly" or in real time, which poses many difficulties. Accordingly, the efficiency of the supply chain inevitably suffers, which translates into cost overruns, late deliveries, over or under production and a myriad of other foreseen and unforseen problems.

SUMMARY OF THE INVENTION

According to the invention, there is provided an active collaboration technology in an open architectural framework that delivers information and decision support tools in a timely, contextual and role sensitive manner to present a collaborative dynamic decision-making capability to a community of role players within a supply chain process. Such a comprehensive collaborative dynamic decision making capability is made possible through the integration of the business process, the organization of role players and relevant business applications.

In this framework, role players collaborate through domain task specific active documents. These documents can present themselves to the user in a manner according to the user's role and the process context. The active documents contain both the necessary business information and decision support tools. These active documents may be accessed via the World Wide Web portion of the Internet or any other computer networking scheme. Such access to these active documents is based on the role of the user and is governed by access control lists of role players. Dynamic decision making is made possible through the delivery of active documents to the appropriate role players in response to events that are triggered by business processes, the users or other business applications.

The active collaboration experience is constituted by four concomitant factors that enable a community of role players in a supply chain to:

Exchange information in both synchronous and asynchronous modes,

Use decision tools to act on the shared information,

Respond to dynamic events that require decision making, and

Engage the proper role players in accordance with the business process.

The active collaboration technology of the present invention employs an open architecture that enables the incorporation of third party tools and other networked business objects useful in managing the supply chain. Preferably, the active collaboration technology blends a number of technologies including:

JAVA, Active X,

Common Object Request Broker Architecture (CORBA), COM,

GroupWare,

Workflow, and

World Wide Web

The distributed collaborative computing supply chain can be remotely and centrally administered and deployed with no client-side installations.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

For purposes of this application, the supply, production and distribution of computer storage products are discussed. However, it is well understood that the supply, production and distribution of other products, such as, for example, computers, automobiles and other products of commerce, may also follow the same or similar course to the marketplace. Accordingly, the present invention is not limited to the supply chain (e.g., supply, production and distribution) of computer storage products, but is equally applicable to other products placed in the stream of commerce.

Figure 1:
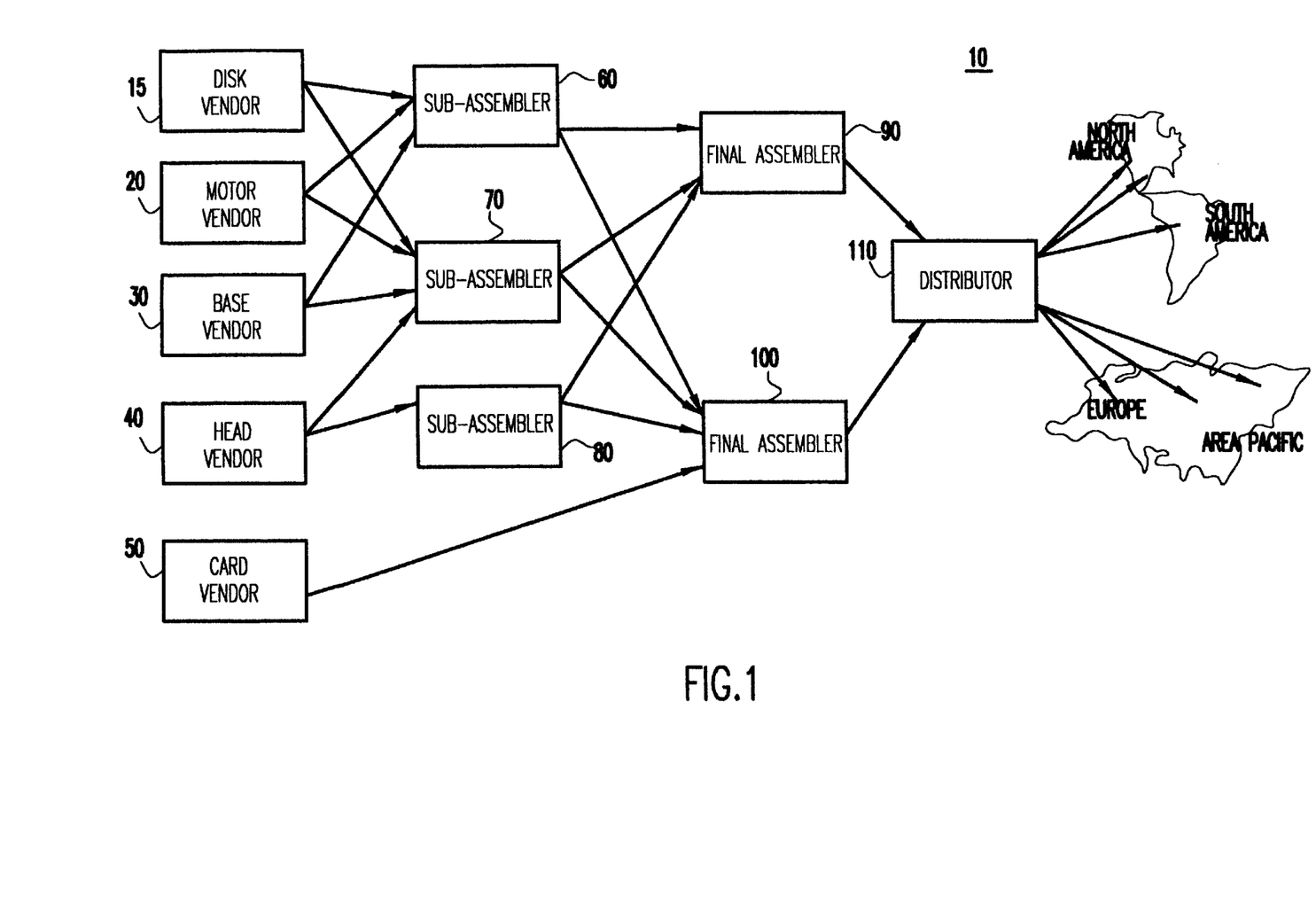
FIG. 1 is a supply chain for computer storage products.

Referring now to the drawings, and more particularly to FIG. 1, a supply chain 10 for computer storage products is shown. The supply chain includes a four-tier production and distribution network spanning external vendors, two tiers of production assembly, and finally distribution to the global market. The external vendors include, for example, (i) a disk vendor 15, (ii) a motor vendor 20, (iii) a base vendor 30, (iv) a head vendor 40 and (v) a card vendor 50. Each vendor 15, 20, 30, 40, 50 supplies their respective components to sub-assemblers or final assemblers, depending on the production capabilities of the sub-assemblers and final assemblers. For example, the disk vendor 15 supplies disks to sub-assembler 60 and sub-assembler 70 as predetermined in the enterprise's material sourcing plan. Similarly, the motor vendor 20 supplies motors to the sub-assembler 60 and sub-assembler 70, and the card vendor 50 provides cards to the final assembler 100.

Once all of the sub-assemblers 60, 70, 80 receive the appropriate components, the sub-assemblers 60, 70, 80 assemble the components and then provide the sub-assembled components to the final assemblers 90, 100. The final assemblers 90, 100 then fully assemble the components and deliver the final assembled products, e.g., computer storage products, to the distributor 110 for distribution to the global marketplace.

However, the supply chain encounters many problems from material constraints from the parts supply vendors to capacity constraints at the production facilities (e.g., sub and final assemblers) to a volatile demand from various global markets. It is thus imperative that the many role players determine, at least, (i) what components need to be delivered to which sub and final assemblers, (i.e., usually depending on where the greatest local demand for the assembled product arises or the need for the production capabilities of the individual sub and final assemblers), (ii) when to deliver the components to the sub and final assemblers and (iii) when and where to deliver the assembled components to the distributor for distribution to the global marketplace.

Thus, in order for the supply chain to function properly and efficiently, each role player in the business process must coordinate their activities with other role players so that the supply and demand of the components and assembled product are synchronized within the supply chain. Accordingly, the management of the supply chain requires that relevant information and tools be made available in a timely manner to the various role players. Thus, a constant exchange of information amongst the role players to maintain congruity between material, capacity, production, and demand at the enterprise and plant level is required. The relevant information and tools include, for example, (i) the dissemination of certain information to certain role players, (ii) processing the shared information, (iii) identifying events in real time (e.g., dynamic) that require involvement by certain role players and (iv)engaging various role players with well-defined responsibilities within the business process.

In order to accomplish the above goals, the present invention provides an active collaboration technology in an open architecture framework to provide information (shared in both an asynchronous and synchronous mode) and dynamic decision making (through decision support tools in an event driven manner) capabilities among several role players who are engaged through decision flow based on underlying business process. Active documents contain relevant information and business tools so that the role players can make appropriate business decisions necessary to maintain the congruity and efficiency of the supply chain.

The active documents integrate the business process, organization of role players and advanced planning decision engines to provide a unified view of the supply chain so that the role player may collaboratively address the supply chain management problem. The underlying information that characterizes the state of the supply chain is garnered to optimize the overall supply chain using planning and scheduling applications. These decision support tools along with relevant information is encapsulated in the active documents. The active documents are then routed to appropriate role players in the supply chain in accordance with business processes. This provides a "unified framework" for collaboratively addressing the supply chain management problem by bringing together organization, business processes and many other applications in a concomitant manner.

In preferred embodiments, the active document technology of the present invention blends several technologies together for continuity between the various applications used to manage the supply chain. For example, active document technology of the present invention blends together (i) Java (used for business objects), (ii) CORBA (used for creating networking the business objects), (iii) Domino®/Notes (used for enabling collaboration among the business objects) and (iv) World Wide Web technology(used as a universal client to access).

The active documents of the present invention is preferably accessed via the World Wide Web portion of the Internet so that all of the role players may have concurrent access to the system in order to collaboratively manage the supply chain. In embodiments, the present invention may also be provided via a proprietary database, other commercial server or other distributed computer networking system. The only constraint imposed by the present invention is that all of the role players have access to the system of the present invention so that they may collaboratively manage the supply chain.

Figure 2:
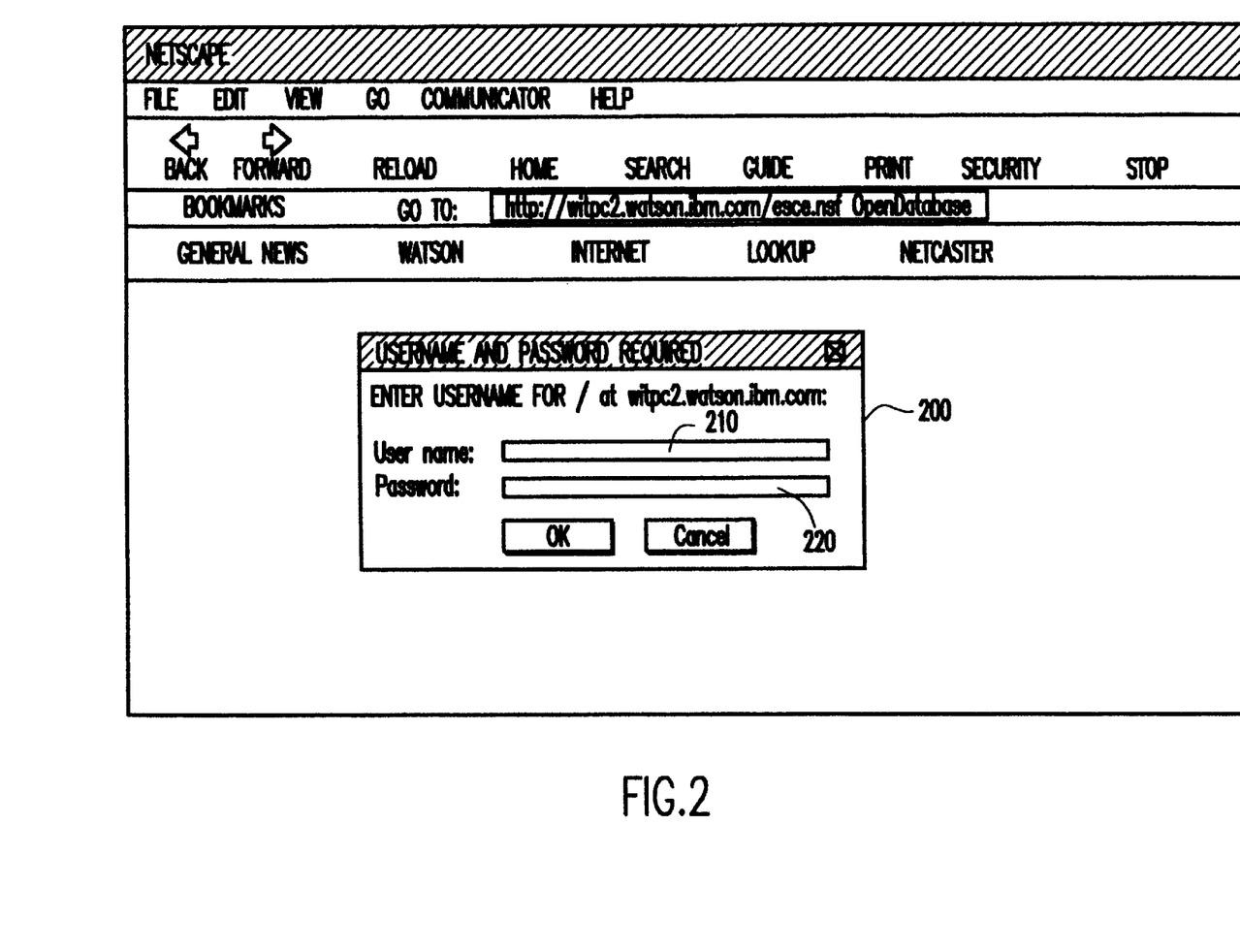
FIG. 2 is a user log on window to log into a collaborative environment.

Referring now to FIG. 2, a user log on window is shown which provides a gateway to access the active documents, and process information necessary for decision making. The log on window 200 also provides a list of active document windows. In embodiments, the user log on window 200 uses a Java-enabled web browser. However, other web browsers or access means are also contemplated for use with the log on window 200. In embodiments, the user log on window 200 includes a user name box 210 and a password box 220 for accessing the active document window. In preferred embodiments, the password limits access to certain active document windows. Once the role players log on to the role sensitive active document window, system documents are generated dynamically and served to the appropriate role players, as described below.

Figure 3:
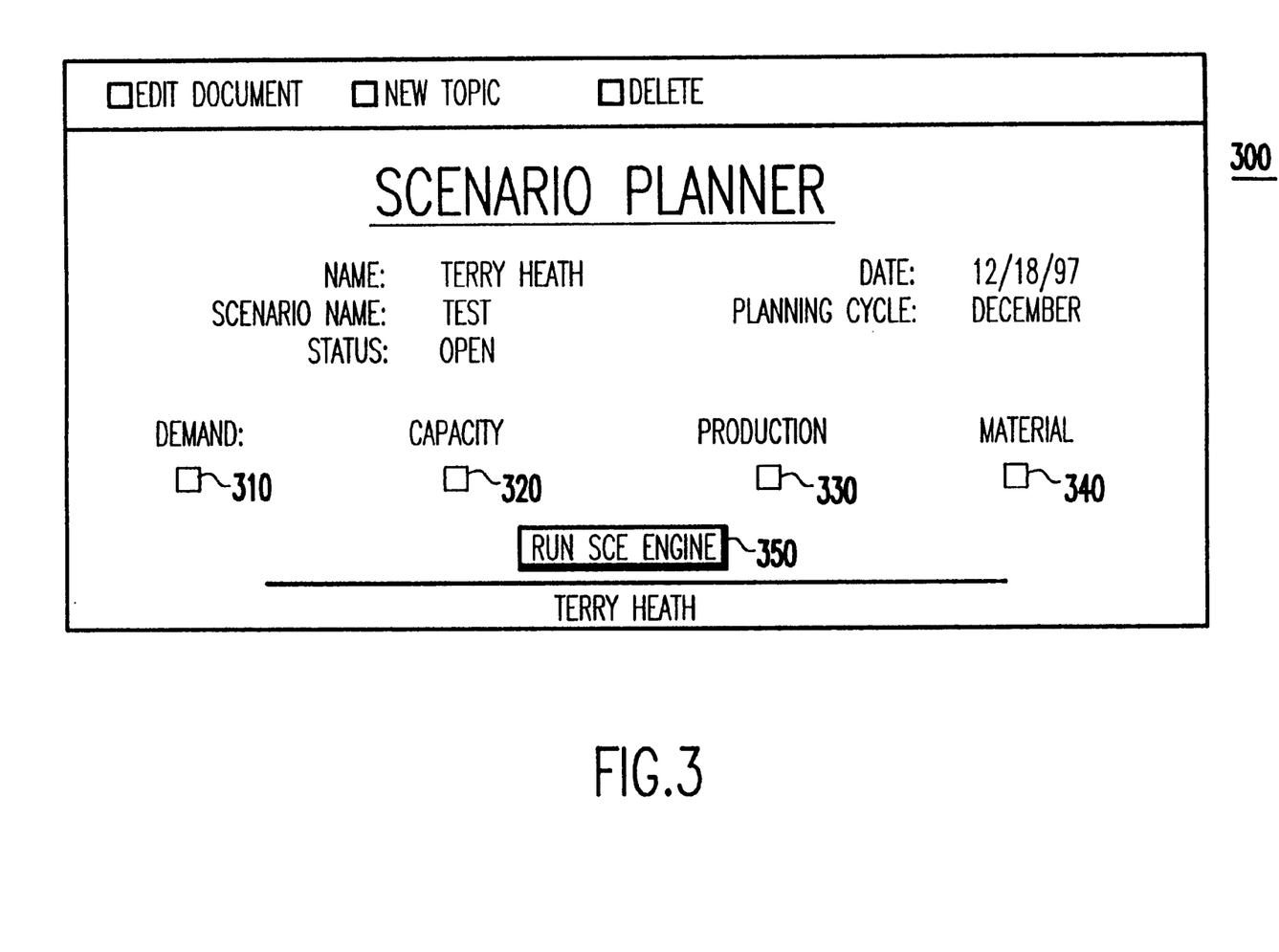
FIG. 3 is an active document window.

FIG. 3 shows an active document window 300 selected by the user from the list of active documents available. The active document window 300 allows role players to actively collaborate between one another in order to manage the supply chain. As previously described, the active document window 300 is preferably based on an open architecture including industry standards which enables the incorporation of third party tools and other networked business objects in order to expand the decision making and collaborative capabilities of the present invention. Specific implementations of the active document allow high enterprise scalability making it easy to deploy across several role players. In embodiments, the active document window 300 may also be centrally administered in order to more easily manage the supply chain.

In the example of FIG. 3, the assemblers 70, 80, 90 have access to, for example, (i) a demand information link 310, (ii) a capacity information link 320 (iii) a production information link 330 and (iv) a material information link 340. These links provide access to active documents that are targeted to provide specific information and decision making capabilities in order to manage the supply chain. The assemblers 70, 80, 90 may also have access to a decision engine link 350.

The assemblers 70, 80, 90 may initiate, revise or review a business scenario (i.e., a plan for the supply, manufacture and distribution of a product throughout the supply chain) by clicking on the appropriate document links which provide dynamic access to the linked information. For example, the role player may access (i) the demand information link 310 to determine the demand of a certain product in a certain geographical area, (ii) the demand information link 310 which provides a business object that allows drill down capability in browsing and editing demand information (FIG. 4), or (iii) the capacity information link 320 to determine the capacity of several suppliers and/or assemblers. The role player may further access the production information link 330, material information link 340 and decision engine link 350.

Figure 3A:
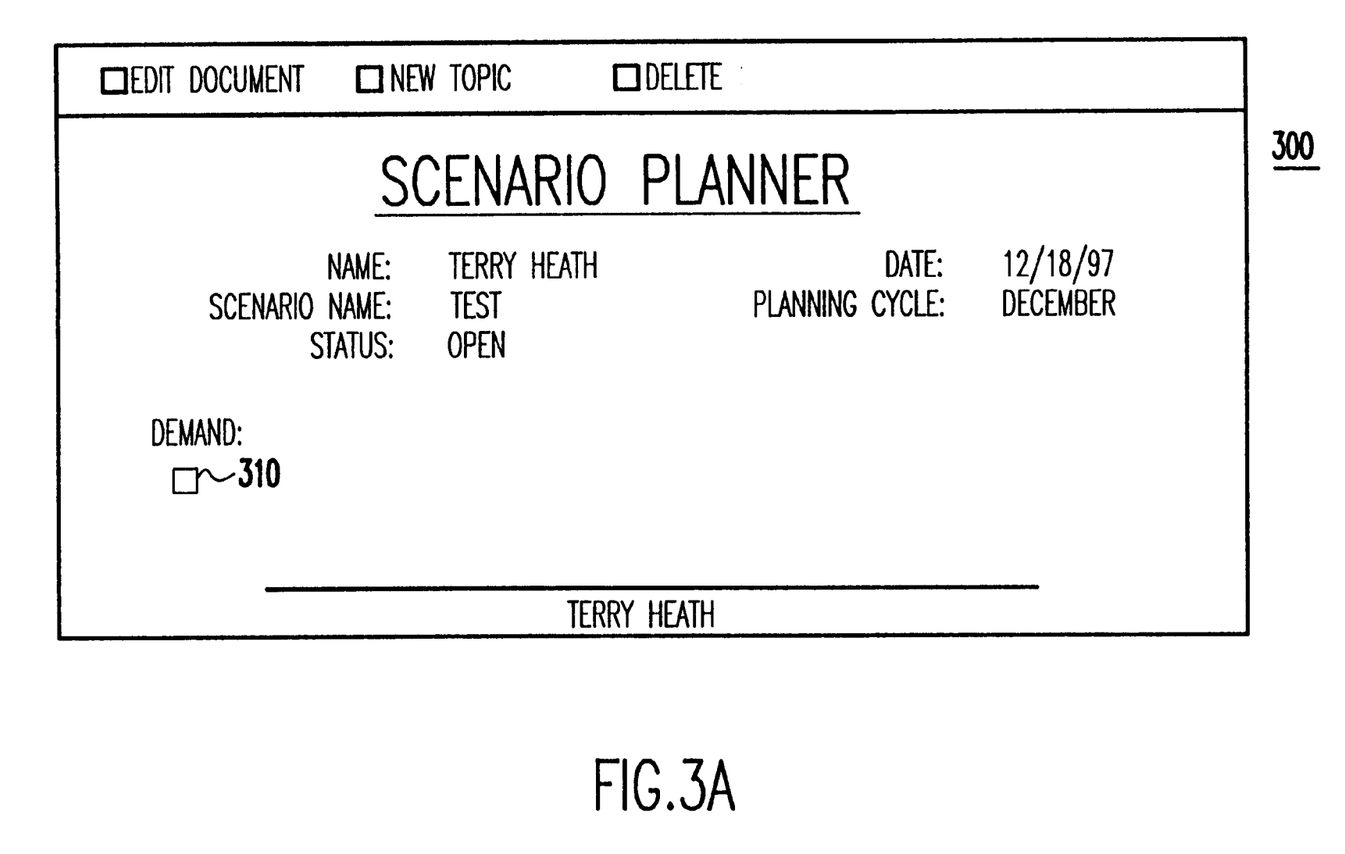
FIG. 3A is another embodiment of an active document window.

Referring to FIG. 3A, in embodiments, one of several different role sensitive active document windows 300 may appear, depending on the sensitivity of the information and the need for certain role players to be included or excluded in certain management decisions of the supply chain. Thus, the present invention is capable of customizing the active document window 300 thereby presenting information relevant only to the role player's role within the business process.

Figure 4:
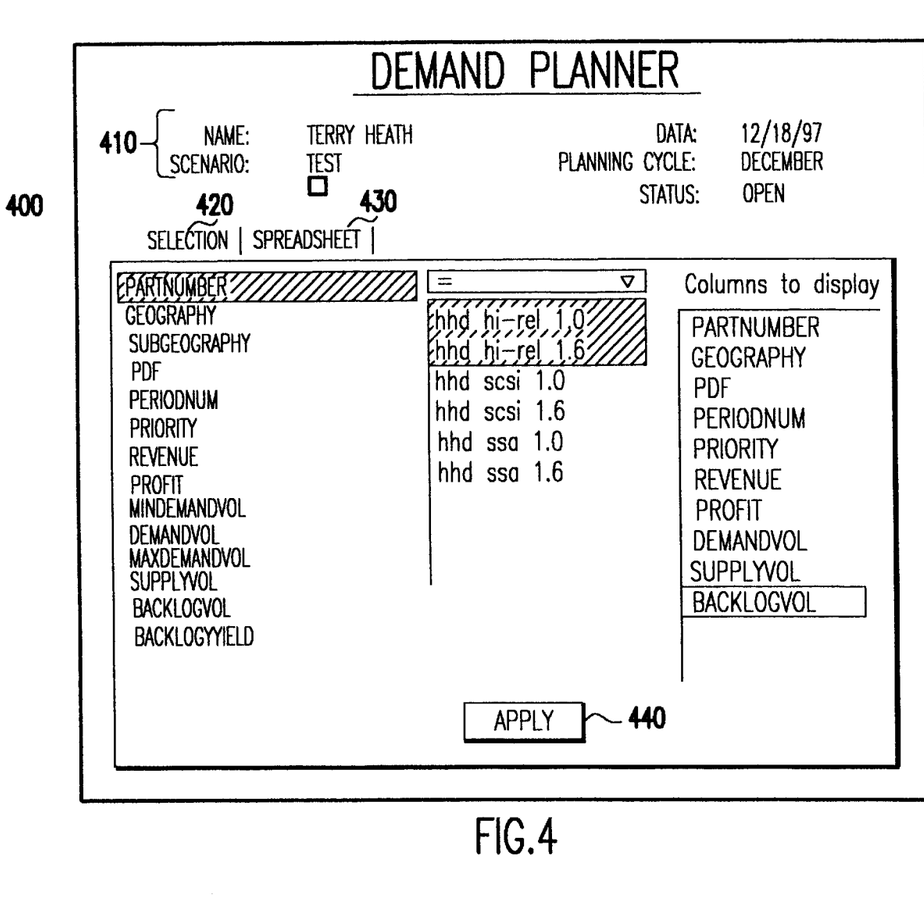
FIG. 4 is a demand document link window.

FIG. 4 shows an active window 400 that may be accessed by a specific role player (e.g., a demand planner)in the supply chain. The active document 400 includes a header 410 which comprises contextual information including, for example, (i) the name of the originator of the scenario, (ii) the scenario name, (iii) the date of which the scenario was created, (iv) the planning cycle for which the scenario applies and (v) the status of the scenario. An embedded business object that provides two visual interfaces, selection interface 420 and spreadsheet interface 430, is also provided. The selection interface 420 provides drill down capabilities by selecting records of interest, whereas the spreadsheet interface 430 allows the user to browse and edit the data associated with the user selection. Once the demand planner peruses the information and any tools (not shown), the demand planner submits it for further action by clicking on the ready for optimization action button 440.

Figure 5:
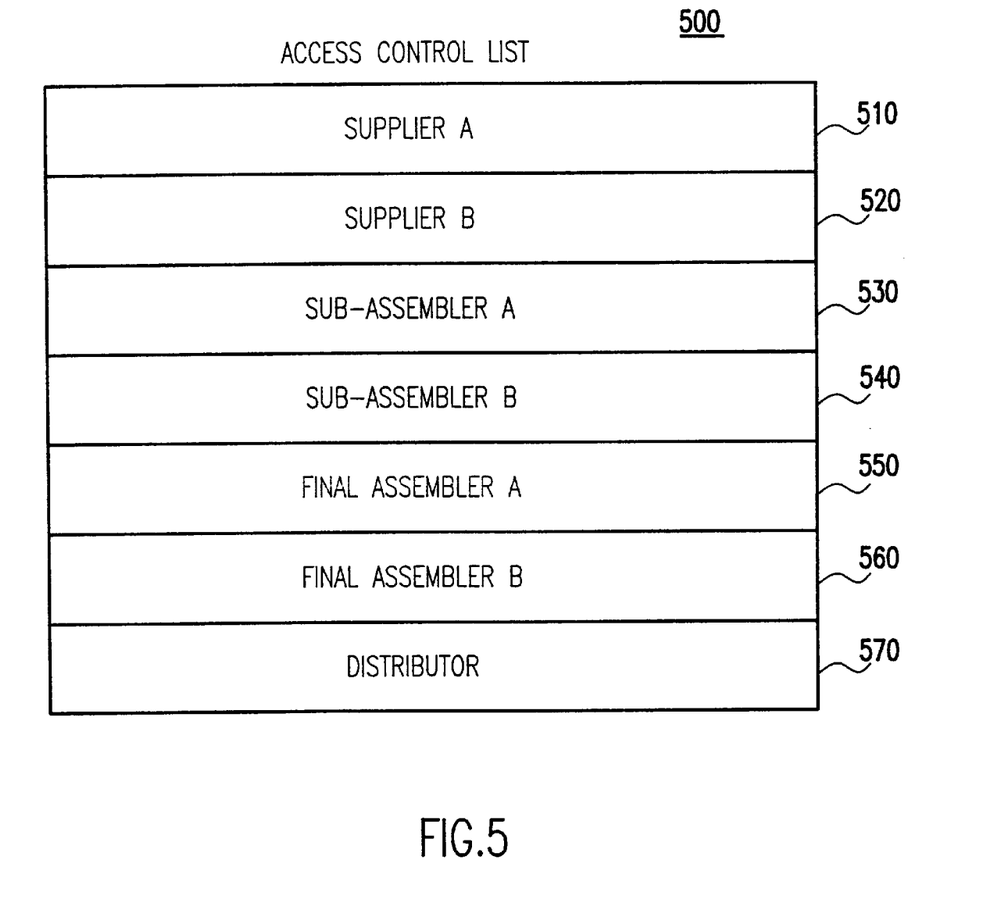
FIG. 5 is an access control list for accessing the active document window.

FIG. 5 shows an access control list 500 which maintains the roles of the various role players so that they may collaborate through the role sensitive active documents windows 300. In preferred embodiments, the access control list 500 also authenticates and defines the system behavior for the various role players depending on their particular roles. In embodiments, the access control list 500 includes (i) supplier A 510, (ii) supplier B 520, (iii) sub-assembler A 530, (iv) sub-assembler B 540, (v) final assembler A 550, (vi) final assembler B 560 and (vii) distributor 570. In embodiments, the access control list 500 is presented in a GroupWare product such as Lotus® Domino®.

By using the role sensitive active document window 300, the role players are able to interact in both asynchronous and synchronous collaboration modes. This permits the role players to collaboratively develop quality decisions and thus maintain efficiency within the supply chain. Also, this allows the shared information to be both structured (e.g., data and information that is typically contained in enterprise relational databases) and unstructured (e.g., qualitative information such as discussions).

Figure 6:
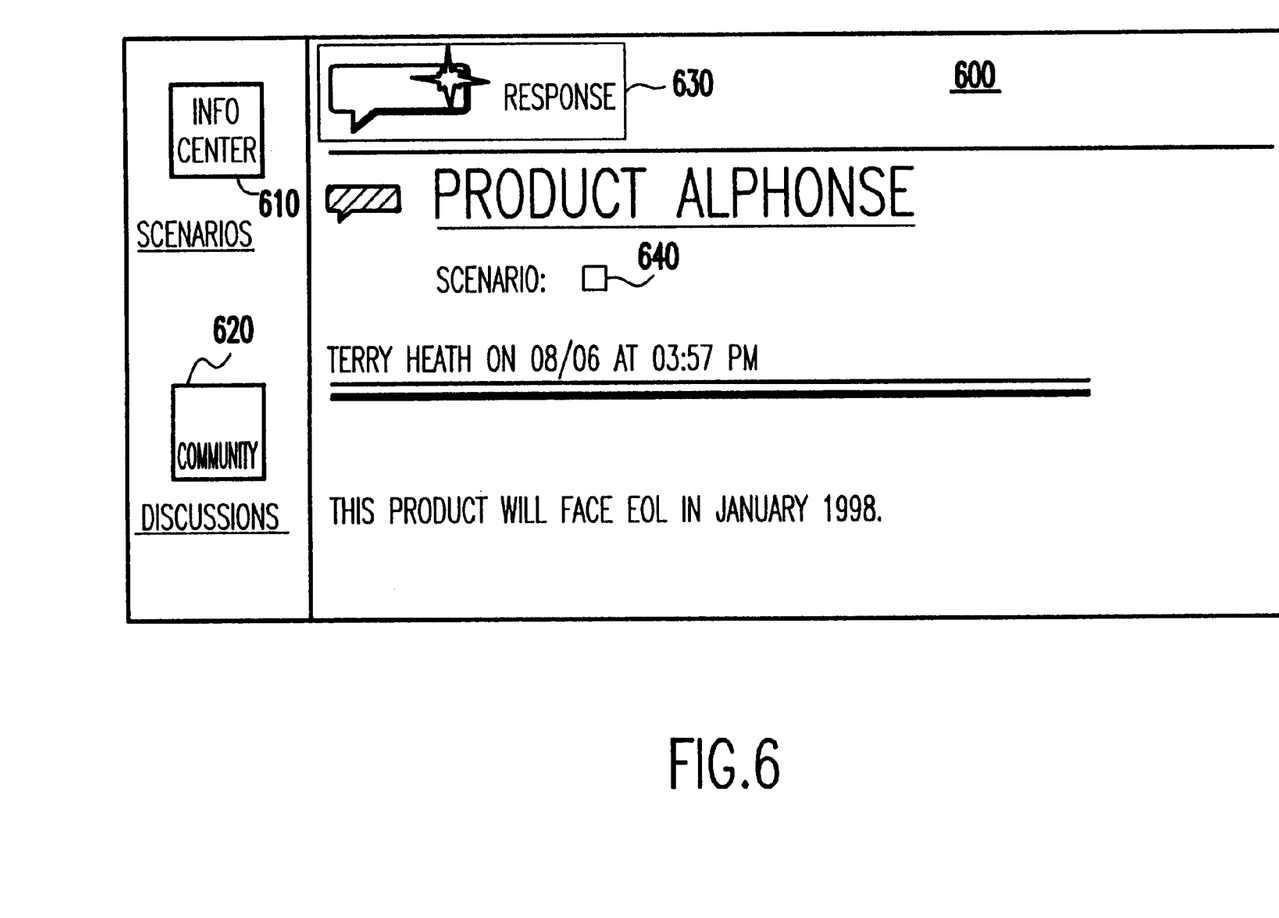
FIG. 6 is an asynchronous collaboration mode window.

FIG. 6 show an asynchronous collaboration mode window 600 which allows the role players to participate in threaded discussions, those discussions that are categorized, sorted and presented flexibly in different views. The asynchronous collaboration mode window 600 includes a scenarios button link 610 which provides access to a scenario window associated with the threaded discussions. Once the scenario is created, it may be transmitted to specific role players, depending on their specific need to access the scenario information. The specific role players may then further collaborate, and, if necessary, refine the scenario. This allows several role players, who have access to the role sensitive active document window 300, to collectively collaborate on the management of the supply chain.

The asynchronous collaboration mode window 600 further includes a discussions button link 620, which shows a view of all ongoing discussions. Also included on the asynchronous collaboration mode window 600 is a response button 630 which provides the role player a means to respond to the discussion topic 640.

Figure 7:
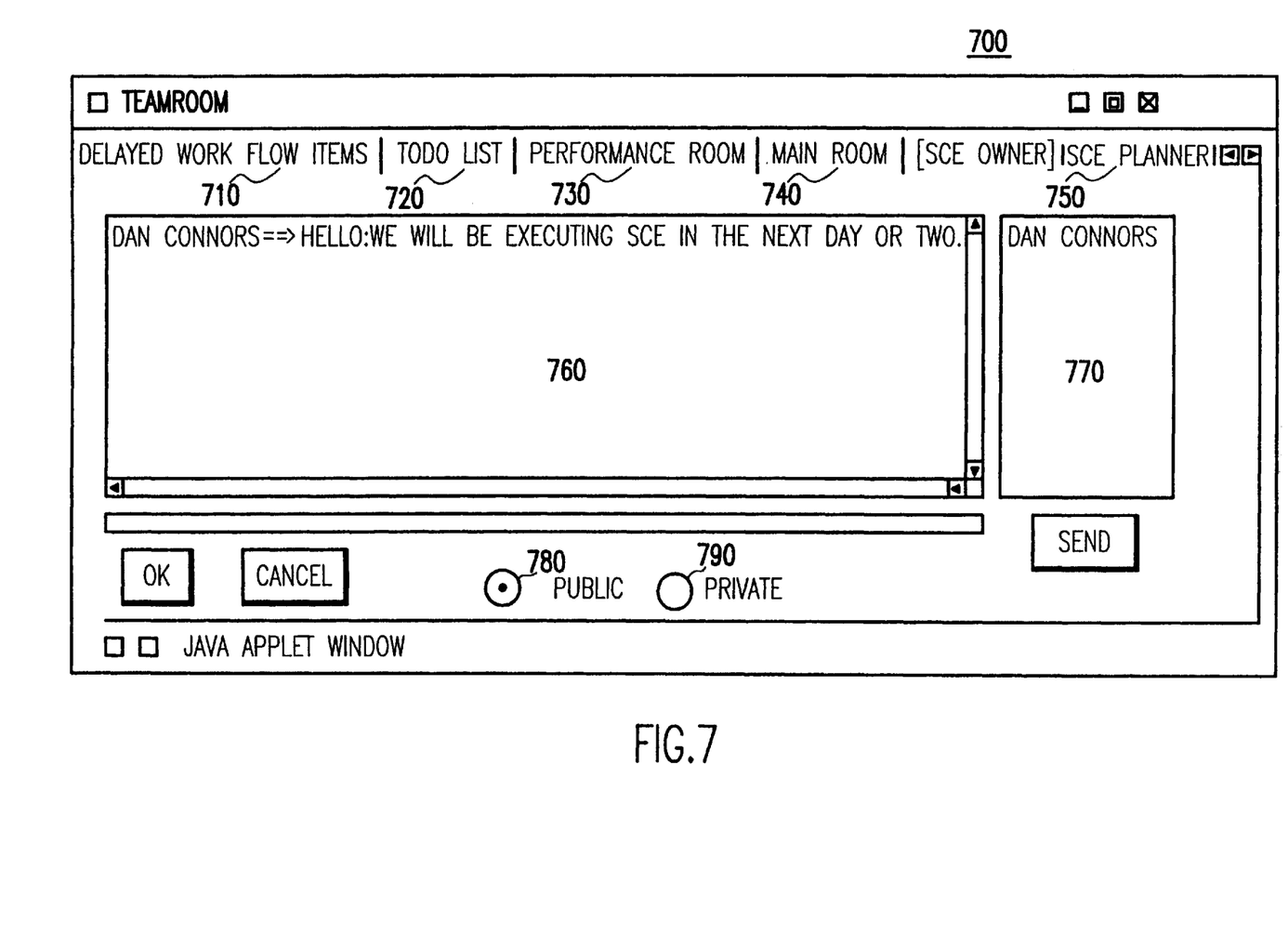
FIG. 7 is a synchronous collaboration mode window.

FIG. 7 shows a synchronous collaboration mode window 700. In preferred embodiments, the synchronous collaboration mode window 700 includes a tool bar having the following buttons: (i) Delayed Work Flow Items 710, (ii) To Do List 720, (iii) Performance Room 730, (iv) Main Room 740 and (v) Planner 750. In preferred embodiments, the synchronous collaboration mode window 700 also includes a chat room window 760 so that the role players may collaborate with one another in real time. A user box 770 providing a list of role players currently logged on and having access to the chat room 760 is also included on the synchronous collaboration mode window 700. In embodiments, when a role player receives an incoming message, an alarm or other notification device is activated so that the receiving role player is notified of the incoming message. Public 780 and private 790 buttons are also available so that the role players may communicate to one another in either a private or public forum.

In preferred embodiments, the system of the present invention is cognizant of important events in the business process and triggers the delivery of work items (related to the decision at hand) to the appropriate role players. For example, when the sub-assemblers 60, 70, 80 initiate a new scenario, the system of the present invention automatically notifies the appropriate role players, via a Universal Resource Locator (e.g., URL), for example, of the new scenario. Clicking on the notification brings the role player to the appropriate active document for executing the work item (FIG. 8).

Figure 8:
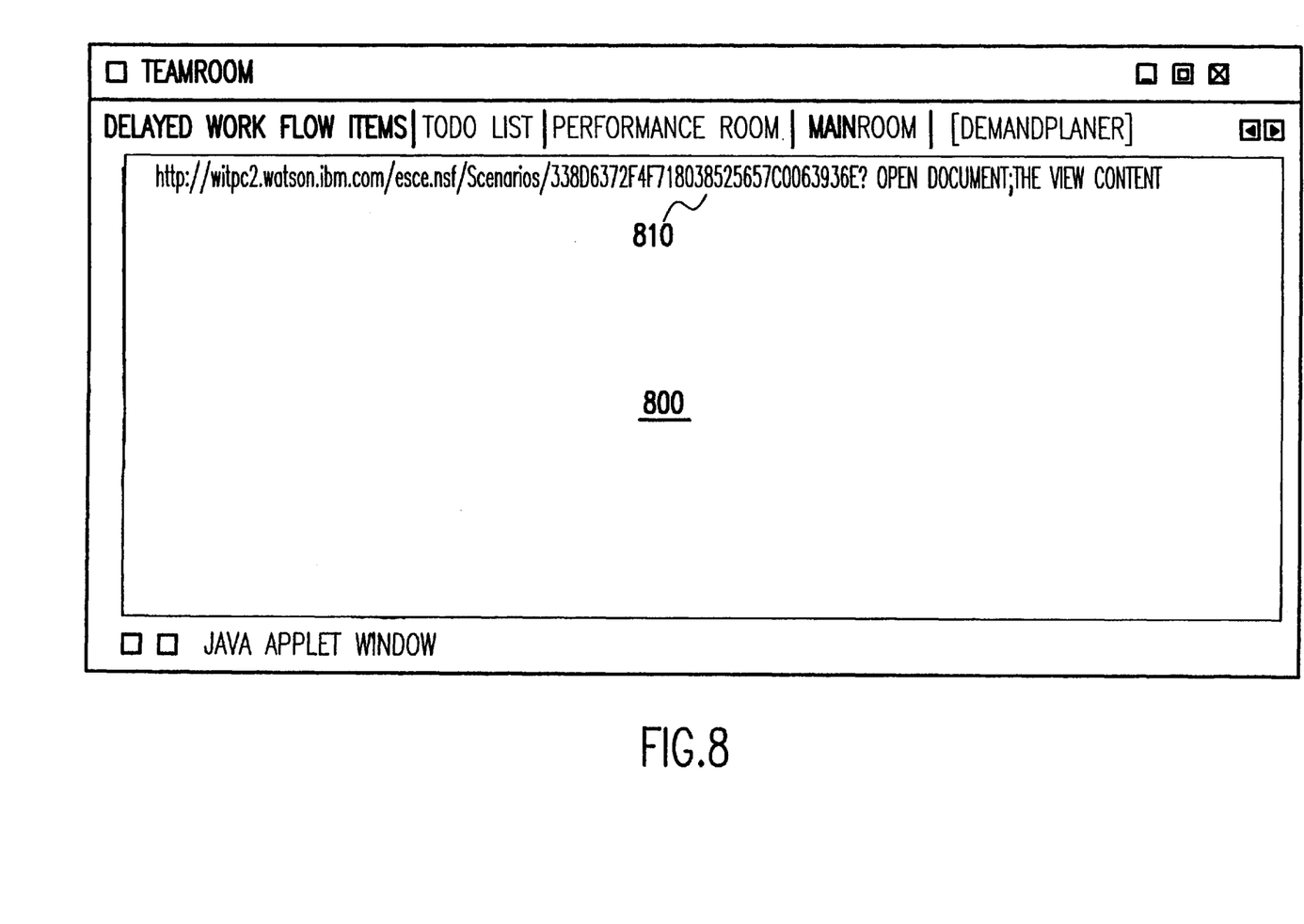
FIG. 8 is a notification window transmitted from the active document window for executing work items.

FIG. 8 shows a synchronous collaboration mode window 800 having a URL 810 of which is a reference to a work order active document sent by the underlying work management system or a participating role player. The URL 810 automatically directs the participating role player to the specific work order. That is, when a new scenario is initiated and a work order changes due to the new scenario, an active work document will automatically be forwarded to the appropriate role players. In embodiments, the business tool or a collaboration between some or all of the role players may devise the work order.

Method of Use

Figure 9:
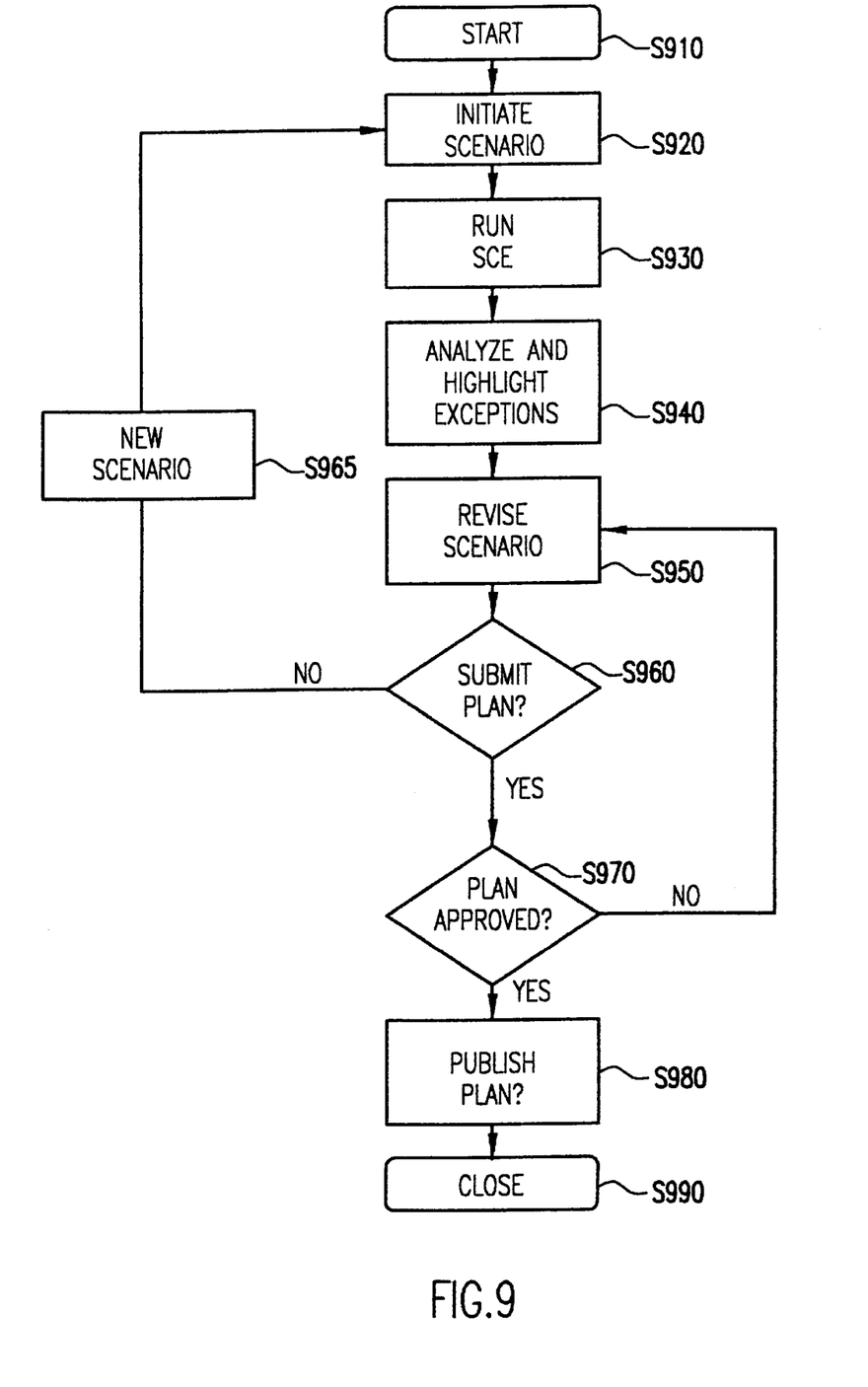
FIG. 9 is a flow chart for performing active collaboration between role players.

FIG. 9 shows a flow chart for performing active collaboration between the role players to ensure congruity and efficiency of the supply chain. The active collaboration process is implemented via the active document window 300. For example, at every step of the flow chart a role sensitive active document window 300 appears so that the role players may collaboratively manage the supply chain, even though the role players may be located at various geographical locations and may only be concerned with discrete aspects of the supply chain.

In Step S910, the business planning process begins. In Step S920, the role players collaboratively create and submit a scenario for the supply, production and distribution of a particular product. In Step S930, well known business tools, such as the Supply Capability Engine (SCE) (e.g., a constrained based supply chain planning and optimization tool) are initiated in order to formulate a business plan. In Step S940, the scenario is analyzed and all exceptions are highlighted. In Step S950, the scenario is collaboratively revised, if necessary, by the participating role players according to the analyzed data. In Step S960, a decision is made whether to submit the plan to the participating role players. If the plan is not submitted, in Step S965, a new scenario is collaboratively devised by the participating role players and resubmitted in Step S920. If the plan is submitted, in Step S970, a collaborative decision is made whether to approve the plan in order to commence the supply, production and distribution of the product. If the plan is not approved, it is revised in Step S950. If the plan is approved in Step S970, it is then published in Step S980. The process ends in Step S990.

It is well understood that the role players may have access to all portions of the active documents. However, depending on the sensitivity of the information and the need for certain role players to be included or excluded in certain management decisions, the role players may not be provided access to certain sensitive information.

Example of Use

By way of one example, an initial scenario may be devised according to the above method of use, as described with reference to FIG. 9. However, due to a change in global demand, the distributor may initiate a new scenario, via the scenario window (accessed by the scenario link button 610). The vendors and assemblers are then automatically notified in real time of the their respective new work orders (e.g., new responsibilities) via the active document window 800 which contain the respective URLs of the vendors and assemblers.

New work orders may be generated by, for example, the business tools associated with the system of the present invention. However, in embodiments, the vendors and assemblers may collectively collaborate with one another to devise a production and delivery scheme, via the active document window 300, asynchronous window 600 or synchronous 700 window, in order to devise new work orders. In response to the new work orders, the vendors and assemblers may immediately readjust their performance and/or supply schedules in accordance with the business plan devised based on the new scenario.

However, if one assembler 60, for example, cannot increase its production, it may also access the scenario window and initiate a new scenario based on its particular circumstances. In this instance, the business application then automatically readjusts the production capabilities of assembler 70 and notifies the assembler 70, via the active document window 800, of its new increased production requirements. During this process, any or all of the role players may collectively and collaboratively adjust and refine (i) the scenario, (ii) their specific requirements, or (iii) redefine their responsibilities within the supply chain by accessing the active document window 300, asynchronous window 600 or synchronous 700 window. Once a new scenario is again devised, all of the appropriate role players will be notified of their respective new work orders.

It is well understood by persons skilled in the art, that many other examples and scenarios are also contemplated for use with the present invention.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A communication and decision support method of collaboratively devising, disseminating, deciding and communicating a business plan in a community of role players within a supply chain, comprising:

collaboratively creating a business scenario by role players having permission to access interactive role sensitive active documents for supply, production and distribution of a product, wherein the interactive role sensitive active documents comprise relevant business information related to the supply chain and business support tools enabling role players to make appropriate decisions for maintaining congruity and efficiency of the supply chain, and wherein the interactive role sensitive active documents are dynamic documents rendering data to a role player in the community of role players based on a predefined role of the role player and a within a context of business processes within the business scenario;

collaboratively submitting the business scenario, via the interactive role sensitive active documents on a distributed network, to the several role players having permission to access the interactive role sensitive active documents in response to the collaboratively creating the business scenario;

collaboratively dynamically formulating the business plan based on the collaboratively created and submitted business scenario; and nesting and maintaining the business scenario and the business plan in the interactive role sensitive active documents including updates of the business scenario and the business plan in response to the collaboratively dynamically formulating the business plan.

2. The method of claim 1, further comprising collaboratively dynamically analyzing the business plan, via the interactive role sensitive active documents, by the several role players having permission to access the interactive role sensitive active documents in response to at least collaboratively dynamically formulating the business plan.

3. The method of claim 2, further comprising collaboratively revising the business plan by the role players according to the collaboratively dynamically analyzed business plan.

4. The method of claim 1, further comprising:
collaboratively approving the business plan responsive to the collaboratively dynamically formulating the business plan; and
publishing an active work document including work to be performed by specific role players based on the approved business plan, wherein the active work document is triggered by predefined events which occur during the formulation of the business plan.

5. The method of claim 4, further comprising automatically forwarding the active work document to the role players via the distributed network, depending on the role players need to access the active work document in order for the role players to commence the supply, production and distribution of the product.

6. The method of claim 1, further comprising coordinating the role player's activities with one another via the interactive role sensitive active documents over the distributed network during the collaboratively creating the business scenario so that the supply and demand of the products are synchronized within the supply chain.

7. The method of claim 1, wherein well-defined responsibilities for each role player, in order to synchronize the supply and demand of the products within the supply chain, are provided on the interactive role sensitive active documents and sent to the role players by the distributed network.

8. The method of claim 1, wherein the role players having permission to access the interactive role sensitive active documents are not provided access to all portions of the interactive role sensitive active document.

9. The method of claim 1, wherein the collaboratively creating the business scenario is performed by the role players dynamically exchanging information in real time in order to manage the supply chain.

10. The method of claim 1, wherein the role players participate in one of threaded discussions and dynamic discussions while collaboratively creating the business scenario.

11. The method of claim 1, wherein the interactive role sensitive active documents integrate the business scenario, business tools and the role players in order to collaboratively dynamically formulate the business plan.

12. The method of claim 1, wherein access to the interactive role sensitive active documents is controlled by an access control list which maintains specific roles of the role players and allows access to several interactive role sensitive active documents on a limited basis, depending on the role player's need for business information and access to decision making capabilities.

13. The method of claim 1, wherein the role players initiate, revise or review the business scenario based on the collaboratively creating the business scenario by accessing document links providing dynamic access to linked information on the interactive role sensitive active documents.

14. The method of claim 13, further comprising:
accessing a demand information link in order to determine a demand of the product, and
accessing a capacity information link in order to determine a capacity of the role players to produce the product
wherein both the accessing the demand information link and the capacity information link are responsive to the initiating, revising or reviewing the business scenario.

15. The method of claim 1, wherein the role players collaborate in one of a public forum and a private forum while collaboratively creating the business scenario.

16. The method of claim 15, further comprising an alarm when an incoming message is received by one of the role players while collaboratively creating the business scenario.

17. A means for collaboratively devising, disseminating and communicating a business plan in a community of role players within a supply chain, comprising:
creating means for collaboratively creating a business scenario by the role players having permission to access interactive role sensitive active documents for supply, production and distribution of a product, wherein the interactive role sensitive active documents comprise relevant business information related to the supply chain and business support tools enabling role players to make appropriate decisions for maintaining congruity and efficiency of the supply chain, and wherein the interactive role sensitive active documents are dynamic documents rendering data to a role player in the community of role players based on a predefined role of the role player and a within a context of business processes within the business scenario;
submitting means for collaboratively submitting the business scenario to the several role players having permission to access the interactive role sensitive active documents via the interactive role sensitive active documents on a distributed network;
formulating means for collaboratively dynamically formulating the business plan based on the collaboratively created and submitted business scenario; and
nesting and maintaining means for nesting and maintaining the business scenario and the business plan in the interactive role sensitive active documents including updates of the business scenario and the business plan.

18. The means of claim 17, further comprising analyzing means for collaboratively dynamically analyzing the business plan by the several role players having permission to access the interactive role sensitive active documents.

19. The means of claim 17, further comprising publishing means for publishing an active work document including work to be performed by specific role players based on the business plan, wherein the active work document is triggered by predefined events which occur during the formulation of the business plan.

20. The means of claim 17, further comprising forwarding means for automatically forwarding an active work document to the role players based on the business plan, depending on the role players specific need to access the active work document, in order for the role players to commence the supply, production and distribution of the product.

21. The means of claim 17, further comprising control list means for maintaining specific roles of the role players and allowing access to several interactive role sensitive active documents on a limited basis, depending on the role player's need for business information and access to decision making capabilities.

22. The means of claim 17, further comprising informing means for informing the role player of other participating role players within the collaborative environment based on attributes such as (i) participating role players' role within the business processes, (ii) organizational applications or (iii) authority level.

\* \* \* \* \*